MEANS FOR AUTOMATIC TELEPHONE TRAFFIC TO SUBSCRIBER'S LINES IN PRIVATE AUTOMATIC BRANCH EXCHANGES

Filed June 23, 1965

INVENTOR.
ANTON KRISTIAN DIESEN
BY Hane and Nydick
ATTORNEYS

INVENTOR.
ANTON KRISTIAN DIESEN
BY Hane and Nydick
ATTORNEYS

Sept. 16, 1969 A. K. DIESEN 3,467,786

MEANS FOR AUTOMATIC TELEPHONE TRAFFIC TO SUBSCRIBER'S LINES IN PRIVATE AUTOMATIC BRANCH EXCHANGES

Filed June 23, 1965 3 Sheets-Sheet 3

INVENTOR.
ANTON KRISTIAN DIESEN
BY Hane and Nydick
ATTORNEYS

United States Patent Office 3,467,786

Patented Sept. 16, 1969

3,467,786
MEANS FOR AUTOMATIC TELEPHONE TRAFFIC TO SUBSCRIBER'S LINES IN PRIVATE AUTOMATIC BRANCH EXCHANGES

Anton Kristian Diesen, Hagersten, Sweden, assignor to Telefonaktiebolaget L. M. Ericsson, Stockholm, Sweden, a corporation of Sweden Filed June 23, 1965, Ser. No. 466,363
Claims priority, application Sweden, July 2, 1964, 8,048/64
Int. Cl. H04m *3/42, 3/00*
U.S. Cl. 179—18 3 Claims

ABSTRACT OF THE DISCLOSURE

In a telephone system comprising a public automatic exchange connected by a plurality of trunk lines to a private automatic branch exchange (PABX), each trunk line has a subscriber's number and terminal in the public automatic exchange. Some of the PABX subscribers have subscriber numbers and terminals in the PABX, and they correspond to the numbers assigned to the trunks. When one of the predetermined numbers is called, it is identified in the public exchange, and by means of a number sender and a selector a trunk line is seized, over which signals indicating the desired subscriber number are sent to the PABX. Means in the PABX receive the signals and connect the called subscriber's line to the selected trunk line, while means in the public exchange connect the calling line to the same trunk line.

The present invention relates to telephone systems and refers to an arrangement for connecting telephone communications automatically from a public automatic exchange to a subscriber's line in a private automatic branch exchange. Between the public exchange and the private branch exchange there are trunk lines which form one or more groups of lines and are called by means of one common number or several different calling numbers, Incoming calls to a private branch exchange are generally connected by an operator in the private branch exchange. It is known for so-called night service to connect telephone communications automatically from the public exchange to certain subscriber's lines in the private branch exchange, each of these subscriber's lines being provided with a subscriber's number in the public exchange. Then generally some of the trunk lines are each switched to its own subscriber's instrument and the number of the line equipment of a trunk line in the public exchange is called instead of the common calling number of the exchange. The trunk lines referred to cannot after the switching be used for public traffic to the private branch exchange.

The function of an operator in a private branch exchange belonging to a business enterprise is to direct incoming calls, with a knowledge of the staff and the organization of the enterprise, to the right person. A very great number of the incoming calls are however connected by persons who are acquainted with the enterprise and know with whom they wish to talk. The swiftly proceeding automatization of all telephone traffic has led to the desire to be able to connect telephone communications fully automatically to the subscriber's lines of a private branch exchange without the aid of an operator. The connections are set more swiftly and without the risk of misunderstanding if they are established fully automatically. In larger exchanges telephone operators will be saved. The problem has hitherto been solved by means of in-dialing. The calling subscriber at first connects the calling number of the private branch exchange. A free trunk line is selected automatically, dialling tone is obtained from the private branch exchange and then the number of the called subscriber's line within the exchange is dialled.

It must in this case be possible to send the digit signals, generally dial pulses, through the public exchange which in some telephone systems presents difficulties. This procedure is furthermore unsatisfactory when the number of digits to be sent becomes great, and because it is inconvenient to wait for dialling tone from the private branch exchange.

An object of the invention is to provide apparatus which avoids such inconveniences.

Generally, the invention contemplates that the number of digits be reduced by providing those subscriber's lines of a private branch exchange which are to be called fully automatically, with an individual subscriber's number in the public exchange as well as in the private branch exchange. Here it is presupposed that only comparatively few subscriber's lines in each exchange have so large a number of calls incoming from the public exchange, which should be connected without the aid of the operator that the costs for a fully automatic connection of these calls is economically practical. The subscriber's numbers of the public exchange that here are to be contemplated especially, are the individual numbers of the trunk lines but it should be possible to use whichever available subscriber's number. The invention may also be applied, independently of the construction of the public exchange, regarding telephone systems as well as regarding the location of the public exchange in a telephone network, for example as terminal exchange, group exchange or main exchange. The trunk lines are therefore connected as subscriber's lines and do not occupy a traffic route extending from a group selector stage.

The invention is characterized by apparatus in the public exchange, comprising an identifier and a number sender and a selecting device, that connects the number sender to a free trunk line selected in the public exchange for a call to the subscriber's number in the public exchange. The terminal of the called subscriber's number is identified by the identifier which transfers necessary information regarding the number of the identified terminal to the number sender, after which signals which indicate the number of the called subscriber in the private branch exchange are sent through the trunk line to the private branch exchange. Apparatus in the private branch exchange under the guidance of signals connects the trunk line selected in the public exchange, to the subscriber's line.

The invention will be hereinafter more fully described with reference to the accompanying drawings, wherein:

FIGS. 1–2 show traffic route diagrams as an aid in explaining how an arbitrary subscriber's number in the public exchange may be used for calls to a subscriber's line in a private branch exchange wherein FIG. 1 shows a simple embodiment having only one private branch exchange and only one number sender.

Figure 1:
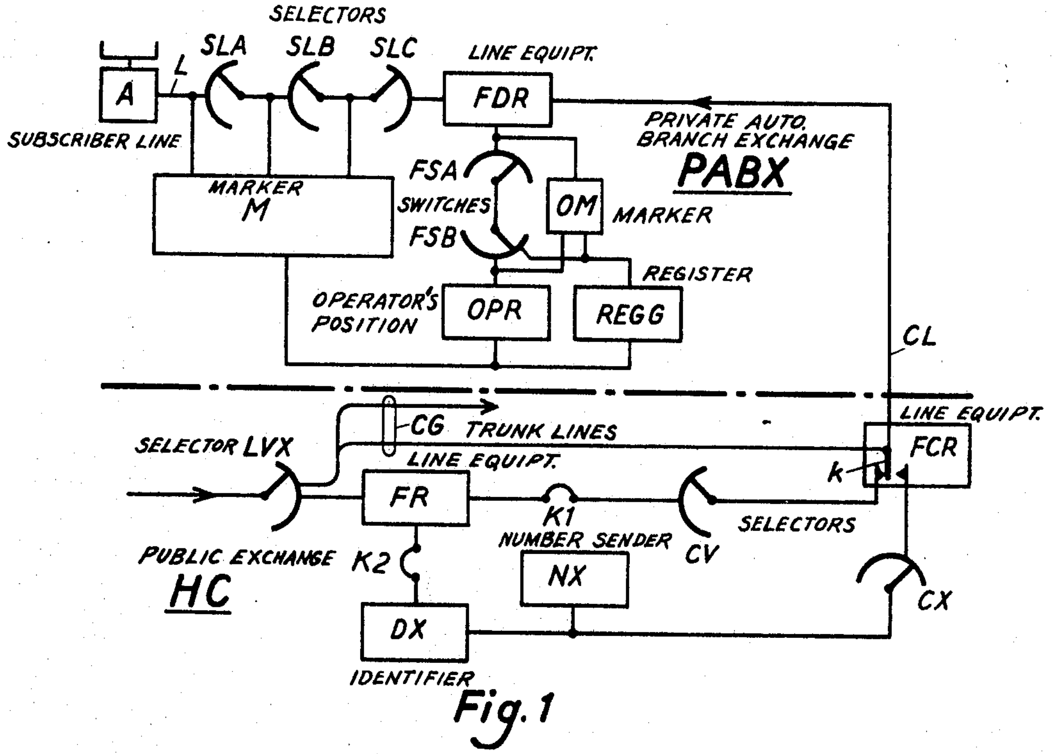

In FIG. 1, PABX is a private automatic branch exchange, HC a public exchange, and CL is a trunk line connecting the private branch exchange with the public exchange. With respect to the public exchange HC the figure shows only a PBX-line selector LVX and the equipment required according to the invention for traffic to the private branch exchange.

The construction of the private branch exchange is irrelevant to the invention except for the registers REGG for incoming traffic. FIG. 1 intends to show the traffic from the public exchange HC to a subscriber's line L having a subscriber's instrument A. In the private branch exchange, SLA, SLB and SLC are crossbar switches which are set by means of a marker M, and FDR is the line equipment of a trunk line CL which by means of the crossbar switches FSA–FSB may be connected either to an operator's position OPR or to a register REGG. The crossbar switches FSA–FSB are set by means of a marker OM.

In the public exchange the trunk line CL has a line equipment FCR which is connected to the line selector LVX and, by means of a contact means *k*, may be switched between the selecting devices CV and CX. A subscriber's line equipment FR in the public exchange is associated with line L in exchange PABX. The equipment FR is, by means of an intermediate connection K1, connected to the selecting device CV, and, by means of an intermediate connection K2, connected to an identifier DX. A number sender NX is connected with the identifier DX and with selector CX.

From the public exchange HC a group of trunk lines CG extend to the exchange PABX. The trunk line CL is one of the lines in this group. If the private branch exchange is called by means of the common subscriber's number of the exchange, the line selector LVX will select in known manner a free trunk line in the group CG, for example the line CL. A ringing signal is supplied from selector LVX through the line CL to the line equipment FDR which is operated by the ringing signal and connects the line CL by means of the crossbar switches FSA, FSB to the operator's position equipment OPR with the co-operation of the marker OM. When the operator answers, the ringing will be interrupted and an answer is marked in known manner in the public exchange HC. By means of the crossbar switches SLA, SLB, SLC and the marker M the operator connects the trunk line CL to the desired subscriber's instrument, for example instrument A.

At a fully automatic call to the subscriber's instrument A a subscriber's number in the public exchange HC which number is individual for the instrument A and the subscriber's line L, will be called. The line equipment belonging to this number comprises the relay set FR which, for the call, is operated by the testing circuit of the selector LVX. The ringing signal is interrupted in known manner by means in the relay set FR without marking an answer signal for call metering. From the relay set FR the identifier DX is called by means of a marking wire connected in an intermediate connection K2. By means of the marking wire the identifier is marked busy and the line terminal of FR relay set is identified. The identification is transferred to the number sender NX and the selector CX is operated so as to connect the number sender NX to a free trunk line equipment FCR in the public exchange. Then the contact means *k* is actuated and the trunk line CL is connected with the number sender NX by means of the selector CX. The line equipment FDR receives a seizing signal from line equipment FCR but no ringing signal from selector LVX which causes the marker OM to connect line equipment FDR to a register REGG instead of to an operator. The number sender NX transmits signals to the register REGG. These signals indicate the number of the called subscriber's line L within the exchange PABX. Then the register REGG will be connected to the marker M which under control of the registration in register REGG sets the crossbar switches SLA, SLB, SLC so that a telephone communication is established between the trunk line CL and the subscriber's line L.

It has been assumed that the number transmission from number sender NX to register REGG occurs very swiftly, for example by means of a voice frequency combination, and therefore only one number sender NX and one selector CX are required. During the number transmission the line equipment FR is marked though the intermediate connection K1 in the multiple of the selector CV which is operated by line equipment FCR and connects line equipment FR with the contact means *k*. After the number transmission, units DX, NX and CX will be released, the contact means *k* is restored and a telephone communication is obtained passing through units LVX, FR, K1, CV, FCR, CL, FDR, SLC, SLB, SLA, L1, to the subscriber's instrument A.

Figure 2:
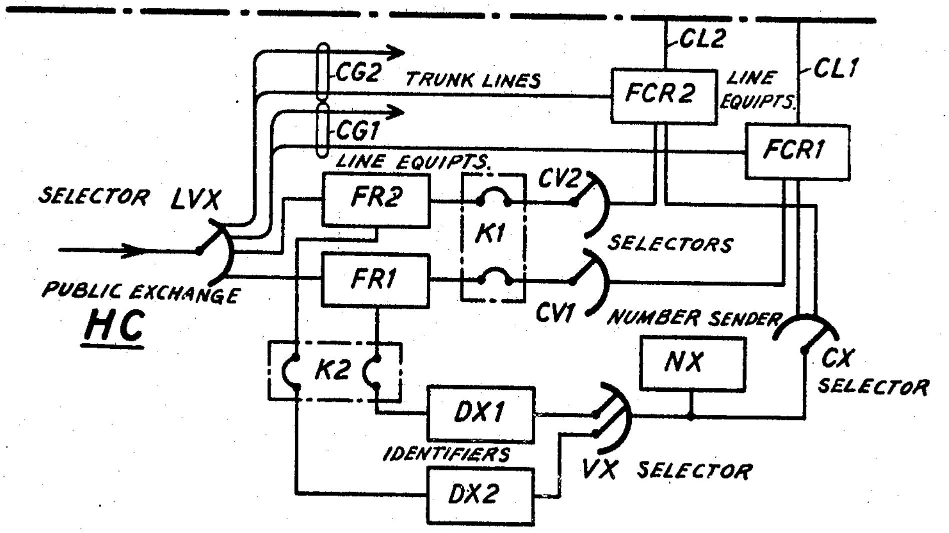

In the embodiment for the public exchange HC according to FIG. 2, a plurality of number senders NX are common to a plurality of private branch exchanges. In the figure are shown two groups of trunk lines CG1 and CG2. In each group is shown a trunk line CL1 and CL2 respectively, belonging to different private branch exchanges. The line equipment FR1 and FR2 may be selected arbitrarily within the subscriber's line multiple of the public exchange HC and are connected by means of intermediate connections K1 and K2 respectively to selecting devices CV1 and CV2 respectively and to identifying means DX1 and DX2 respectively. Each of the two groups of lines CG1 and CG2 belong to a private branch exchange and each are called by means of its own telephone number.

For a call to the line equipment FR1, the identifier DX1 will be operated. The identifier selects a free number sender NX and connects itself thereto by means of a selector VX. The number of the line equipment FR1 is transmitted to the number sender NX which through the aid of a selector CX selects a free trunk line, for example CL1, to the private branch exchange that is intended by the call. The selected trunk line CL1 is marked in the multiple of the selector CV1 and a connection is established between line equipment FR1 and the line equipment FCR1 by means of the selector CV1 and the intermediate connection K1. Then the identifier DX1 will be released and is used for the next call.

The number sender NX sends the number of the called subscriber's line through the selector CX, the line equipment FCR1 and the trunk line CL1 to a register REGG in the private branch exchange. After the number has been transmitted from sender NX to register REGG, sender NX and selector CX will be released and a telephone connection is established passing via units LVX, FR1, K1, CV1, FCR1, CL1 to the called subscriber's line in the private branch exchange, for example through units FDR, SLC, SLB, SLA, L and A in the exchange PABX according to FIG. 1.

The embodiments according to FIGS. 1–2 refer to telephone systems of the kind in which the line selectors LVX for a call to a private branch exchange hunt a free trunk line CL. In telephone systems with crossbar switches and markers, the selecting device CV may be saved and the subscriber's numbers that correspond to the trunk lines CL may be used to connect calls fully automatically to predetermined subscriber's lines in the private branch exchange.

Figure 3:
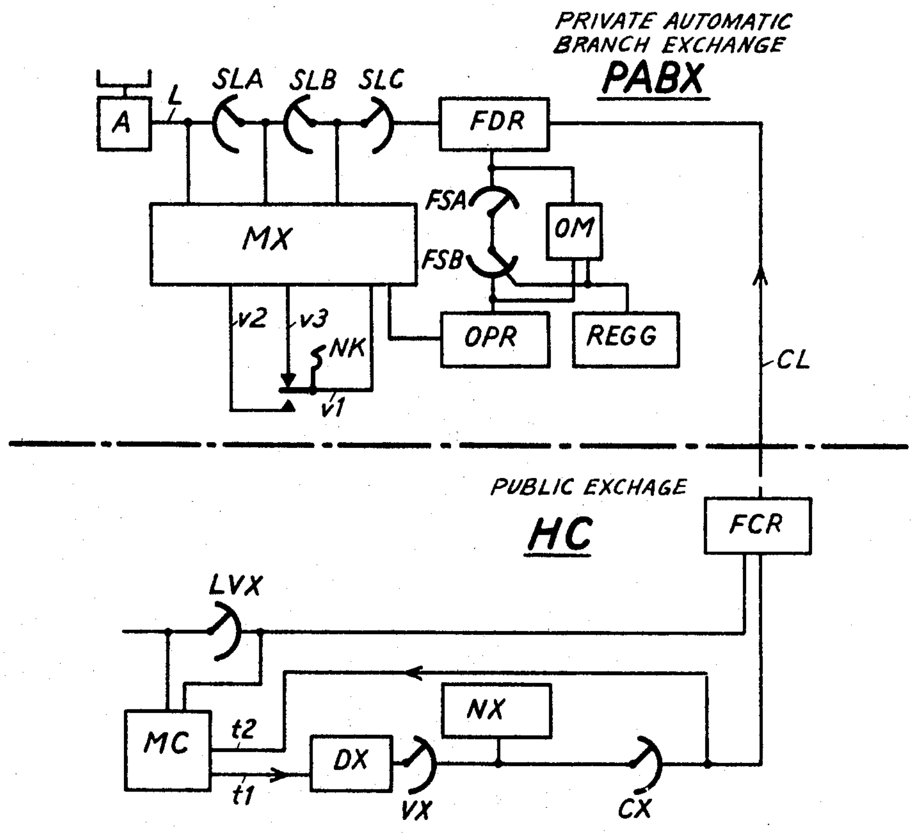
FIGS. 3–4 show by similar diagrams how the subscriber's numbers of the public exchange, corresponding to the trunk lines of a private branch exchange may be used for calls to certain subscriber's lines in the private branch exchange.

In FIG. 3, HC is a public exchange having a line selector LVX which is set by means of a marker MC. A called line is marked by means of a marking wire or number wire. For a call to the common number of a private branch exchange the marker selects a free trunk line CL among a number of trunk lines and marks the selected line in the multiple of the selectors LVX. To each subscriber's line belongs a number wire, for example *t*1, which for common subscriber's lines is connected with a marking wire, for example *t*2. A call directed to the number of the line terminal of the trunk line CL in the subscriber's multiple of the selectors LVX, causes in a conventional telephone system marking of the trunk line CL without the possibility of selecting any other line.

In FIG. 3, there are for each trunk line the separate number wire *t*1 and the marking wire *t*2. The number wires are connected to an identifier DX which, by means of a selector VX, may select a free number sender NX. For a call to the subscriber's number corresponding to the number wire *t*1, the identifier DX will be operated. The called number is identified and is transmitted to a number sender NX which, through the aid of a selector CX, selects a free trunk line CL to the private branch exchange PABX. By means of units DX, VX, the selector CX and the wire *t2* the marker is operated, so that the line CL is marked in the multiple of the selectors LVX as though the marker MC had selected the line CL directly, i.e. as though the number wire *t1* had been connected with the marking wire *t2*. A connection is set up by means of selector LVX to the line equipment FCR, and then units MC, DX and VX will be released. The number sender NX is, by means of the selecting device CX, connected to the line equipment FCR and the trunk line CL and transmits the called number from the public exchange to the private branch exchange. Then the number sender will be released and a contact means (*k* in line equipment FCR) switches the line equipment FCR as has been described above for FIG. 1.

Figure 4:
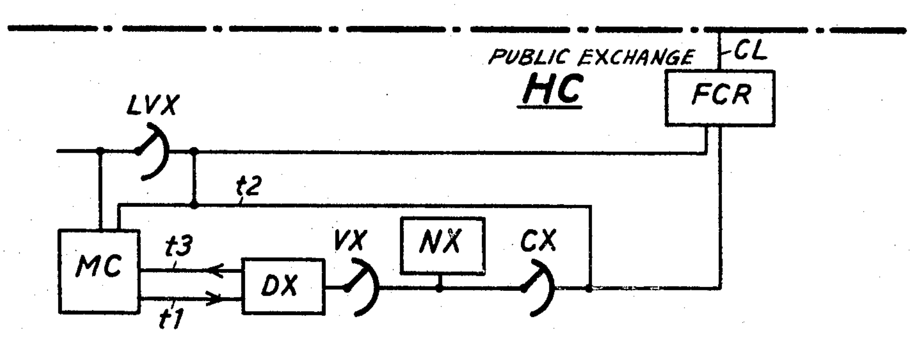

It is not necessary that the selecting device CX in FIGS. 3–4 selects a free trunk line. The equipment of FIG. 4 shows that the selection of a free trunk line may be carried out by the markers MC in the usual manner for crossbar switch systems. A call directed to the line L in the private branch exchange PABX operates the identifier DX by means of the marking wire *t1*. The identifier operates the selecting device VX that selects a free number sender NX, and restores the call to the marker MC by means of the marking wire *t3* connected to the number wire of the common calling number to the private branch exchange PABX. Then the marker MC selects a free trunk line and marks this by means of a marking wire *t2* in the multiple of the selectors LVX as well as in the multiple of the selectors CX. A selector LVX is connected to the line equipment FCR simultaneously with the number sender NX, after which units MC, DX and VX will be released. After the called number has been transmitted to the private branch exchange, units NX and CX will also be released and the trunk line is switched in line equipment FCR from selector CX to selector LVX.

Figure 5:
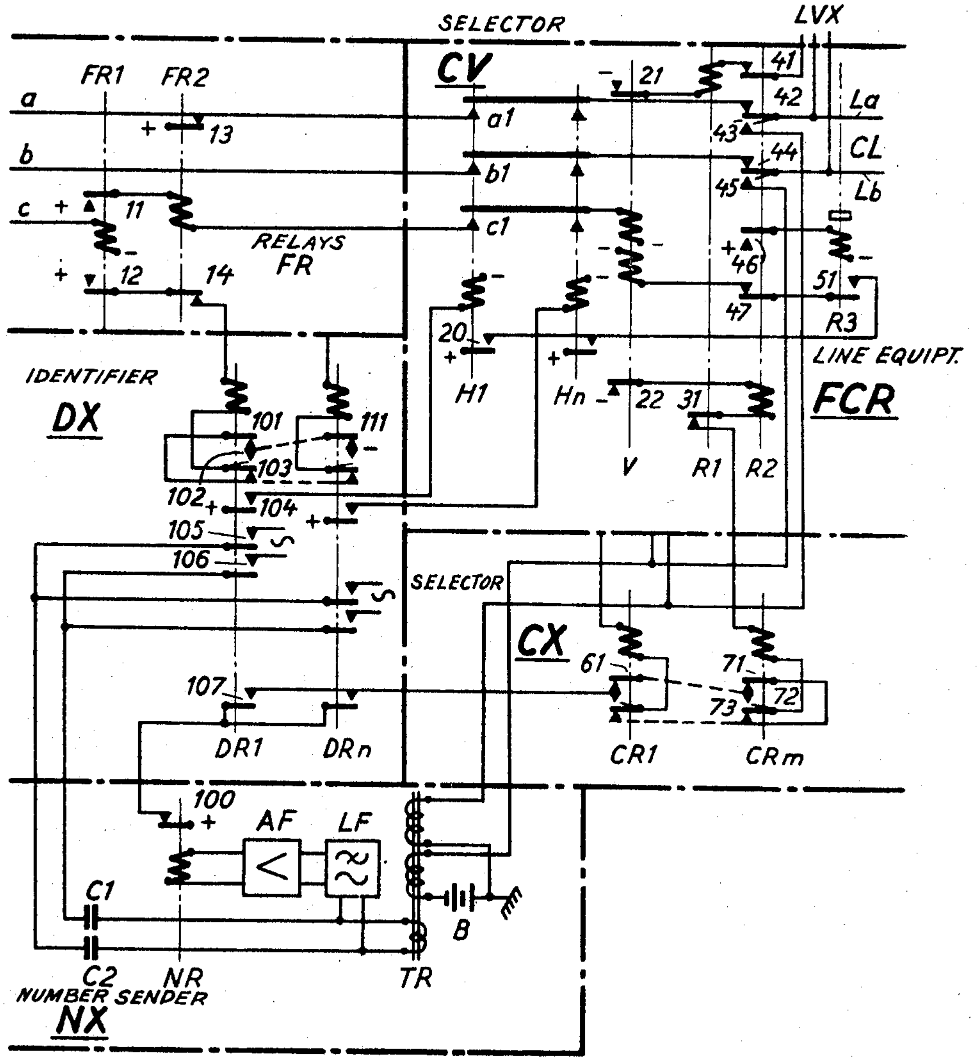
FIG. 5 shows a detailed diagram of the embodiment of part of FIG. 1.

In FIG. 5 are shown; relays FR and connecting wires *a, b, c* of a subscriber's line connection; an identifier DX consisting of a relay chain; a number sender NX comprising means for sending and receiving of voice frequency signals; a selecting device CX that selects a free trunk line; and a selecting device CV consisting of a crossbar switch with selecting magnets H1—H*n* and with an operating magnet V. FIG. 5 shows the equipment required in the public exchange HC of FIG. 1.

For a call to the subscriber's number of the public exchange, corresponding to the line connection FR the relay FR1 operates in a circuit passing through the wire *c*. The contacts 11–12 are actuated.

Simultaneously a circuit is completed passing from terminal + through the contact 13 and the wire *a*. This circuit interrupts the ringing signals from the calling line selector without marking an answer from the called line. If the identifier DX is free, the following circuit is completed: terminal +, the contacts 12, 14, the winding of the relay DR1, the contacts 103, 101 . . . 111, to a negative terminal. The relay DR1 operates. The contacts 101–107 are actuated. In the relay chain DR1–DR*n* only one relay at a time may be maintained energized and each relay DR1–DR*n* corresponds to a subscriber's number in the public exchange and to a subscriber's number in the private branch exchange PABX in FIG. 1.

The identifier DX is in this case is connected directly to the number sender NX and the number that corresponds to the relay DR1 is transmitted to sender NX in the form of a voice frequency or voice frequency combination by a circuit containing the contacts 105, 106, the capacitors C1, C2 and the lower winding of the transformer TR. Simultaneously a free trunk line is selected by means of the selecting device CX which consists of a relay chain CR1–CR*m*. This relay chain comprises a relay for each of those trunk lines which connect the public exchange with the private branch exchange PABX. Only one relay at a time may be maintained energized in the relay chain CR1–CR*m*. Here it is assumed that the trunk line CL corresponding to the relay CR*m*, is free and is selected. The following circuit will be completed: terminal +, the contacts 100, 107, 61 . . . 71, 73 the winding of the relay CR*m*, the contact 31, the winding of relay R2, the contacts 22, to a negative terminal. The relays CR*m* and R2 attract. The contacts 71–73 and 41–47 are actuated.

Calls to the trunk line CL are marked by a direct current loop passing from ground, the upper winding of the transformer TR, the contact 43, the line wire L*a*, a relay in the line equipment FDR in FIG. 1, the line wire L*b*, the contact 45, the intermediate winding of the transformer TR, to the battery B. The voice frequency signal passing through the lower winding of the transformer TR is transformed into the line loop L*a*–L*b* and is received in the register REGG in the private branch exchange. After the number of the called line has been received and registered in the private branch exchange, a voice frequency signal will be sent from the private branch exchange to the number sender NX. This voice frequency signal passes the filter LF which blocks all voice frequency signals transmitted from identifier DX, is amplified in the amplifier AF and operates the relay NR. The contact 100 is actuated and interrupts the current of the relays CR and R2.

During the number transmission described above the selecting magnet H1 in the selecting device CV has operated in a circuit passing through the contact 104 and the slow-operating relay R3 has operated in a circuit passing through the contact 46. The contacts 20 and 51 are closed. When the relay R2 releases its armature, the operating magnet V will operate during the release time of the relay R3 in the following circuit: terminal +, the contacts 20, 51, 47, the lower winding of the operating magnet V, to a negative terminal. The contacts *a*1, *b*1, *c*1 and 21, 22 are actuated. A holding circuit of the operating magnet V is completed by the contact 11, the winding of the relay FR2, the contact *c*1, the upper winding of the magnet V, to a negative terminal. The relay FR2 operates. The contacts 13–14 are actuated. A telephone connection is obtained between the wires *a, b* of the line connection and the wires L*a*, L*b* of the trunk line by means of the contacts *a*1, *b*1 and 42, 44. The identifier DX and the number sender NX are released.

As has been described in connection with FIG. 1 the trunk line CL may be connected to two different numbers in the public exchange. A PBX-line selector may connect itself to the line equipment FCR by means of the wires indicated by line selector LVX in FIG. 5. Testing will hereby occur in a circuit passing through the contact 41, the winding of the relay R1, the contact 21, to a negative terminal. The relay R1 operates. The contact 31 is actuated and prevents the trunk line CL from being selected by the selecting device CX. From the line selector, ringing signals are sent to the line C1, which signals in the private branch exchange cause the connection of the trunk line to an operator.

The invention may be further varied without departing from the scope of the invention. Thus a number of special subscriber's lines in the exchange PABX may have a common calling number within the private branch exchange and are selected according to the principle of PBX-lines and simultaneously have a calling number in the public exchange, which is common to several subscriber's line terminals, which number differs from the common calling number valid for the private branch exchange, and is used only for calls to said special subscriber's lines, the selection of a free subscriber's line terminal in the public exchange also occurring according to the principle of PBX-lines.

In all the FIGURES 1–4 it is assumed that the private branch exchange PABX is built by means of crossbar switches which are set by a marker MX. If the trunk lines CL are to be used for night service, the desired arises that calls to the subscriber's number of a certain trunk line in the night-time shall be connected to another subscriber's line L in the private branch exchange than during normal business hours. For this purpose certain number wires in the marker MX of the private branch exchange PABX are switched according to FIG. 3 where the number wire *v*1 may be switched between the marking wires *v*2 and *v*3 by means of a night button NK.

I claim:

1. In an automatic telephone system comprising a public automatic exchange (HC) and a private automatic branch exchange (PABX), a plurality of trunk lines (CL) joining said exchanges and each of said trunk lines having a subscriber's number and terminal in said public exchange, a subscriber's line (L) terminating in said private automatic branch exchange and having one of said subscriber's numbers for trunk lines in said public exchange as well as a subscriber's number and terminal in said branch exchange; means in said public exchange, comprising an identifier (DX) which, for a call to said subscriber's number in the public exchange identifies the called terminal; at least one number sender (NX) and a selecting device (CX) actuated at said call to connect a free trunk line (CL) to said sender; means (105, 106) in said identifier transmitting necessary information regarding the identified terminal to said sender and signals indicating the number of the called subscriber's line in the private branch exchange being sent from the sender through said selecting device and said selected trunk line; means (REGG, SLA, SLB, SLC) in the private branch exchange receiving said signals and connecting the trunk line to the called subscriber's line and means (CV; LVX) in the public exchange connecting the call to said selected trunk line.

2. In an automatic telephone system according to claim 1, a special subscriber's line equipment (FR) for said subscriber's line in the public exchange, said equipment actuating said identifier (DX); a special selecting device (CV) in the public exchange connecting the call through said special subscriber's line equipment to the selected trunk line.

3. In an automatic telephone system according to claim 1, a plurality of number senders (NX in FIG. 2) and a selecting device (VX) connecting said identifier to an idle one of said number senders.

References Cited

UNITED STATES PATENTS

| | | | |
|---|---|---|---|
| 3,264,415 | 8/1966 | Burns et al. | 179—27.02 |
| 3,333,062 | 7/1967 | Young | 179—27.02 |

KATHLEEN H. CLAFFY, Primary Examiner

T. W. BROWN, Assistant Examiner